UNITED STATES PATENT OFFICE 2,621,555

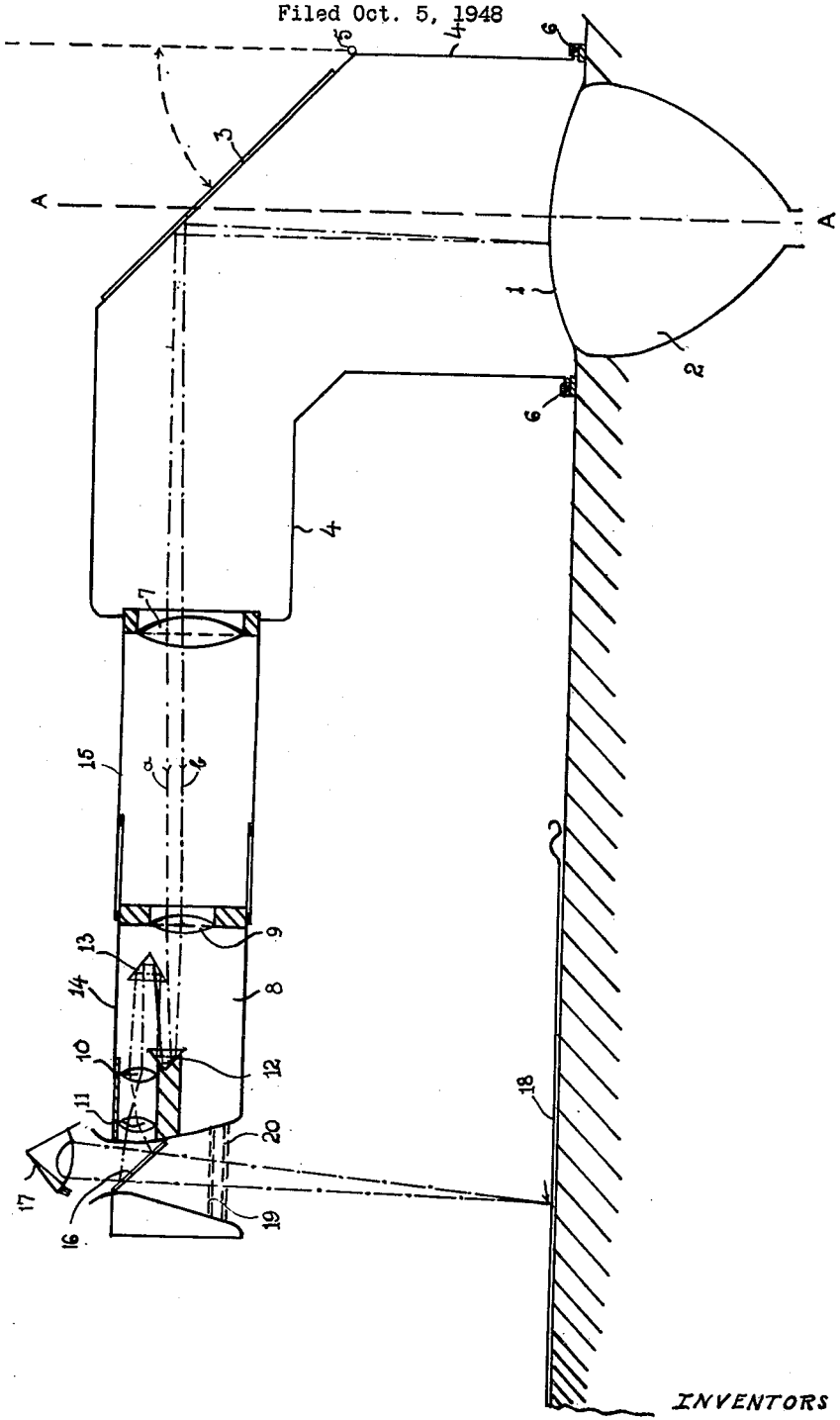

OPTICAL COMPARISON PROJECTION SYSTEM

Brian Clifford Fleming-Williams and John William Jenkins, London, England, assignors to A. C. Cossor Limited, London, England, a company of Great Britain Application October 5, 1948, Serial No. 52,824
In Great Britain October 10, 1947

7 Claims. (Cl. 88—14)

This invention relates to optical apparatus whereby an image of an object can be superimposed directly upon a second object, or upon an image thereof, with which the first-mentioned object is to be compared. Apparatus of this kind may be referred to as a comparator.

An object of the invention is to provide a comparator capable of comparing objects of area greater than that covered by the field of view of the apparatus without requiring any adjustment of the focus of the apparatus.

According to this invention there is provided optical apparatus for producing an image of one object superimposed upon a second object or upon an image thereof, wherein said apparatus comprises an optical system including a lens having the first-named object substantially in its focal plane, and wherein, in order to permit relative displacement of said first-named image and said second object or image, in a plane, another lens of said system is made capable of movement along the optical axis of the system in a region where the rays from any point on the first-named object emergent from the first-named lens are substantially parallel.

One of the objects may, for example, take the form of the screen of a radar display unit of the kind generally known as a plan position indicator (P. P. I.), whilst the second object may be a chart of the area scanned by the radar aerial. One form of P. P. I. is, for example, described in the specification of patent application Serial No. 368,743.

One embodiment of the invention as applied to the comparison of the trace or picture on a P. P. I. screen with a chart of the area scanned by the radar aerial will now be described by way of example with reference to the accompanying drawing.

The screen 1 of the P. P. I. is formed by the approximately horizontal surface of a cathode ray tube 2. A plane mirror 3, silvered on the surface facing the P. P. I. screen, is fixed rigidly to a casing 4, at an angle of 45° to the longitudinal axis A—A of the cathode ray tube, with this axis passing substantially through the centre point of the mirror. The mirror may be hinged at 5 to allow direct observation of the P. P. I. screen. The casing 4 is rotatable about the axis A—A on the bearings 6. The axis A—A passes approximately through the centre of the screen 1 and is normal to the screen at the centre. As shown the screen is curved but it may of course be flat.

Pencils of rays originating from the P. P. I. screen, indicated by chain-dotted lines, are turned through a right angle at the mirror 3 and projected towards a lens 7 fixed to the casing 4. The P. P. I. screen is arranged to lie substantially in the focal plane of this lens and thus the ray pencils emerging from lens 7 have the element rays (such as $a$ and $b$) of every pencil rendered parallel to one another. The image of the P. P. I. screen thus formed is observed with a telescope 8 consisting of lenses 9, 10, 11, positioned to give an erect image of the P. P. I. screen in the eye 17 of an observer, and prisms 12, 13 used to shorten the length of the telescope. The elements 9—13 are enclosed in a casing 14.

The telescope casing 14 is arranged to slide within an extension 15 of casing 4. Since the element rays of pencils between lenses 9 and 7 are parallel, no adjustment of focus of the telescope will be necessary on relative movement of these two lenses along the optical axis.

The image produced by the erecting telescope is reflected at a surface 16 into the eye 17 of an observer and appears to the eye to be superimposed upon, and in the same plane as, a chart 18 which is viewed by light transmitted through the surface 16. The surface 16 is constructed to reflect and transmit light with approximately equal efficiency. Such a surface is known in the art as a half-silvered mirror.

Means may be provided to enable the intensities of the two images to be compared to be made approximately equal to one another. In the drawing there are shown for this purpose two plates of polarising material 19, 20 capable of rotation relative to each other about a suitable axis. The plates enable the intensity of the image of the chart to be reduced to the intensity of the image of the P. P. I. screen.

The radial motion of the telescope 8 with respect to the axis A—A, together with the movement of the casing 4 of the apparatus about the axis A—A enable an observer to select quickly that portion of the chart corresponding to the P. P. I. image observed, and to follow upon the chart any movement of that image.

Means may be provided for altering the scale of the image of the P. P. I. relatively to the scale of the chart. For instance means may be provided in known manner for adjusting the amplitudes of deflecting voltages applied to deflect the beam of the P. P. I. Alternatively a telescope having variable magnification may be used.

Adjustments additional to those described may be provided if desired. For instance the object constituted in the example shown in the drawing by the radar screen may be made rotatable about the axis A—A independently of the casing 4.

It is not essential to use a mirror 3 to turn the optical axis through a right angle. Thus the P. P. I. may be turned through a right angle and disposed with the centre of its screen approximately on the optical axis of the lenses 7 and 9.

We claim:

1. Optical apparatus for producing at a viewing point an image of an object located in a first region superimposed upon an object located in a second region, said apparatus comprising an optical system including first and second optical lens elements, said first lens element having said first region substantially in the principal focal plane thereof and said second lens element comprising a half-silvered mirror, means mounting said second lens element for movement relatively to the first lens element along the optical axis of the system, said half-silvered mirror being positioned to pass to said viewing point light passing through said mirror from said second region and light reflected by said mirror from said first region through said first element, and said apparatus also comprising bearing means mounting said optical system for rotation about the axis of said bearing means, which axis is displaced from said second region.

2. Optical apparatus according to claim 1 and including light-reflecting means located between said first region and the first lens element of said optical system for turning the optical axis of said optical system through approximately a right angle.

3. Optical apparatus for producing at a viewing point an image of a P. P. I. screen superimposed upon a chart, said apparatus comprising means to support a chart, a P. P. I. screen, an optical system including first and second lens elements, said first lens element having said P. P. I. screen substantially in the principal focal plane thereof and said second lens element comprising a half-silvered mirror, means mounting said second lens element for movement relatively to the first lens element along the optical axis of the system, said half-silvered mirror being positioned to pass to said viewing point light passing through said mirror from said chart and light reflected by said mirror from said P. P. I. screen through said first lens element, and said apparatus also comprising bearing means mounting said optical system for rotation about the axis of said bearing means, which axis is displaced from said chart.

4. Optical apparatus for producing at a viewing point an image of the screen of a P. P. I. receiving tube superimposed upon a chart, said screen and said chart being located in a common horizontal plane, said apparatus comprising a plane mirror and means mounting said mirror above said screen for rotation about the axis of said tube, said mirror being inclined to said axis to direct image-forming rays from said screen along a horizontal axis, a lens positioned in the path of said rays and mounted for turning movement with said mirror, said lens serving to direct said image rays outwardly therefrom along parallel paths, a telescope arranged to receive said parallel rays and being mounted for turning movement with said lens and said mirror, said telescope being movable radially with respect to the turning axis of said mirror, and a half-silvered mirror mounted on the outer end of said telescope in a position to receive the rays from said telescope and to reflect said rays vertically to said viewing point, and said chart being positioned beneath said half-silvered mirror so that said chart may be viewed from said viewing point through said half-silvered mirror.

5. Optical apparatus comprising a cathode ray tube having a screen located in a horizontal plane, a plane mirror and means mounting said mirror above said screen for rotation about the axis of said tube, said mirror being inclined to said axis to direct image-forming rays from said screen along a horizontal axis, a lens positioned in the path of said rays and mounted for turning movement with said mirror, said lens serving to direct said image rays outwardly therefrom along parallel paths, a telescope arranged to receive said parallel rays and being mounted for turning movement with said lens and said mirror, said telescope being movable radially with respect to the turning axis of said mirror, and a half-silvered mirror mounted on the outer end of said telescope in a position to receive the rays from said telescope and to reflect said rays vertically along a viewing axis, and means supporting an object on said viewing axis beneath said half-silvered mirror so that said object may be viewed through said half-silvered mirror.

6. Optical apparatus for simultaneously viewing from a viewing point on a common viewing axis a chart and the screen of a P. P. I. receiving tube, said screen and said chart being located in a common horizontal plane, said apparatus comprising a plane mirror and means mounting said mirror above said screen to direct image-forming rays from said screen along a horizontal axis, a lens positioned in the path of said rays and serving to direct said image rays in parallel paths, a telescope arranged to receive said parallel rays and direct them along a horizontal axis intersecting said viewing axis, said telescope being mounted for movement relative to said lens along the axis of said parallel rays, and a half-silvered mirror mounted at the intersection of the axis of said telescope and the viewing axis and being positioned to receive the rays from said telescope and to reflect said rays vertically to said viewing point, and said chart being positioned beneath said half-silvered mirror so that said chart may be viewed from said viewing point through the same area of said half-silvered mirror that reflects image rays from said screen.

7. An arrangement for comparing various parts of the image formed on the screen of a cathode ray tube with indications on a chart which comprises, a first lens system arranged to have the screen of the cathode ray tube positioned in a principal focal plane thereof, so that light rays originating from the screen emerge from said first lens system parallel to one another, a second lens system receiving the parallel rays from said first system, viewing means including a half-silvered mirror arranged to transmit rays from said chart along a viewing axis and to reflect rays from said second lens system along said viewing axis, means mounting said lens systems for rotation of the optical axis of said systems in a plane, and means mounting said second lens system and said viewing means for movement as a unit along said optical axis relatively to the first lens system.

BRIAN CLIFFORD FLEMING-WILLIAMS.
JOHN WILLIAM JENKINS.

REFERENCES CITED

The following references are of record in the file of this patent:

UNITED STATES PATENTS

| Number | Name | Date |
|---|---|---|
| 700,547 | Neilson | May 20, 1902 |
| 985,425 | Main | Feb. 28, 1911 |
| 1,381,453 | Courmettes et al. | June 14, 1921 |
| 1,564,418 | Konig | Dec. 8, 1925 |
| 1,589,796 | Eppenstein et al. | June 22, 1926 |
| 2,040,066 | Ursinus | May 5, 1936 |
| 2,368,434 | Turrenttini | Jan. 30, 1945 |
| 2,404,770 | Bennett et al. | July 30, 1946 |
| 2,426,184 | Deloraine et al. | Aug. 26, 1947 |
| 2,470,912 | Best et al. | May 24, 1949 |
| 2,501,446 | Justice | Mar. 21, 1950 |
| 2,536,718 | Brandon | Jan. 2, 1951 |

FOREIGN PATENTS

| Number | Country | Date |
|---|---|---|
| 21,086 | Great Britain | Sept. 25, 1911 |